(12) United States Patent  
Yamagata

(10) Patent No.: US 6,473,227 B1
(45) Date of Patent: Oct. 29, 2002

(54) SILICA GLASS OPTICAL MATERIAL FOR PROJECTION LENS TO BE UTILIZED IN VACUUM ULTRAVIOLET RADIATION LITHOGRAPHY, METHOD FOR PRODUCING THE SAME, AND PROJECTION LENS

(75) Inventor: Shigeru Yamagata, Narashino (JP)

(73) Assignees: Heraeus Quarzglas GmbH & Co. KG, Hanau (DE); Shin-Etsu Quartz Products Co, Ltd., Tokyo (JP)

( * ) Notice: Subject to any disclaimer, the term of this patent is extended or adjusted under 35 U.S.C. 154(b) by 0 days.

(21) Appl. No.: 09/721,863

(22) Filed: Nov. 24, 2000

(30) Foreign Application Priority Data

Nov. 24, 1999 (JP) .......................................... 11-332853

(51) Int. Cl.⁷ ................................................ G02B 5/20
(52) U.S. Cl. ........................ 359/361; 359/350; 359/355
(58) Field of Search ................................ 359/350, 355, 359/361; 65/37, 30.1; 349/4; 430/5; 501/54

(56) References Cited

U.S. PATENT DOCUMENTS

| 5,326,729 A | | 7/1994 | Yaba et al. |
| 5,679,125 A | * | 10/1997 | Hiraiwa et al. ............... 65/397 |
| 5,958,809 A | * | 9/1999 | Fujiwara et al. ............. 501/54 |

FOREIGN PATENT DOCUMENTS

| JP | A-Hei 6-27013 | 5/1991 |
| JP | A-Hei 6-48734 | 2/1994 |
| JP | A-Hei 6-227827 | 8/1994 |

* cited by examiner

Primary Examiner—Mohammad Sikder
(74) Attorney, Agent, or Firm—Milde & Hoffberg LLP

(57) ABSTRACT

A silica glass optical material for projection lens to be used in vacuum ultraviolet radiation lithography using radiation from 155 to 195 nm in wavelength, wherein, said silica glass optical material is of ultrahigh purity, contains from 1 to 10 wtppm of OH groups, from 100 to 10,000 wtppm of F, and from $1\times10^{17}$ to $1\times10^{19}$ molecules/cm³ of $H_2$, and has a distribution in concentration of F that is axially symmetrical to the central axis.

25 Claims, 4 Drawing Sheets

Fig. 1
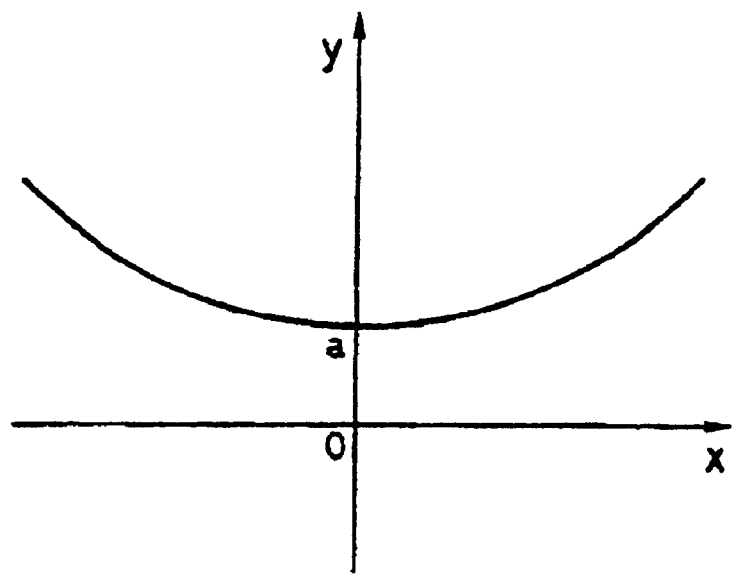
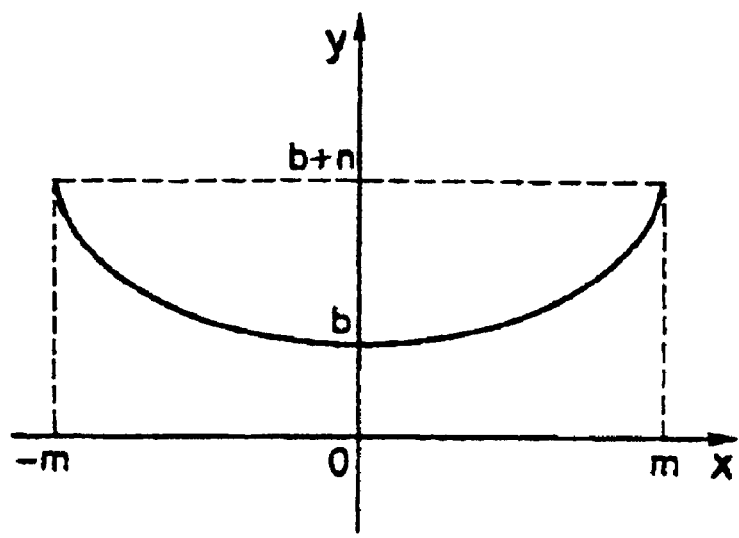
Fig. 2

Example 1

Example 5

Fig. 6
Example 1
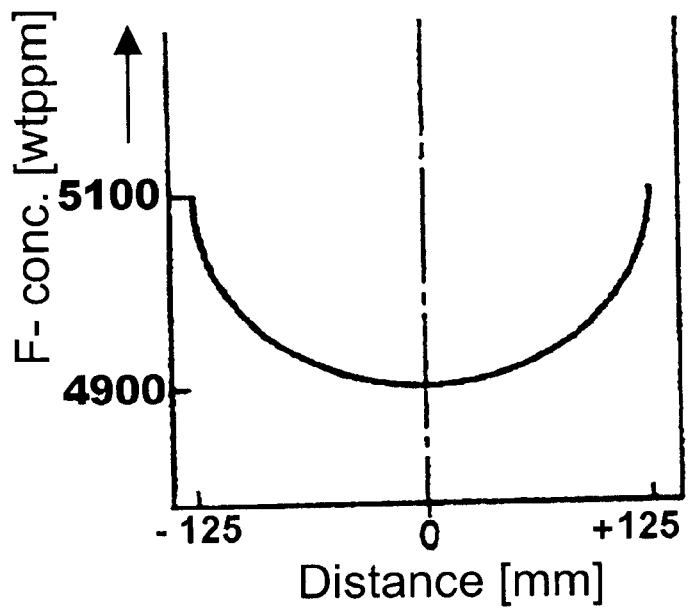
Example 3
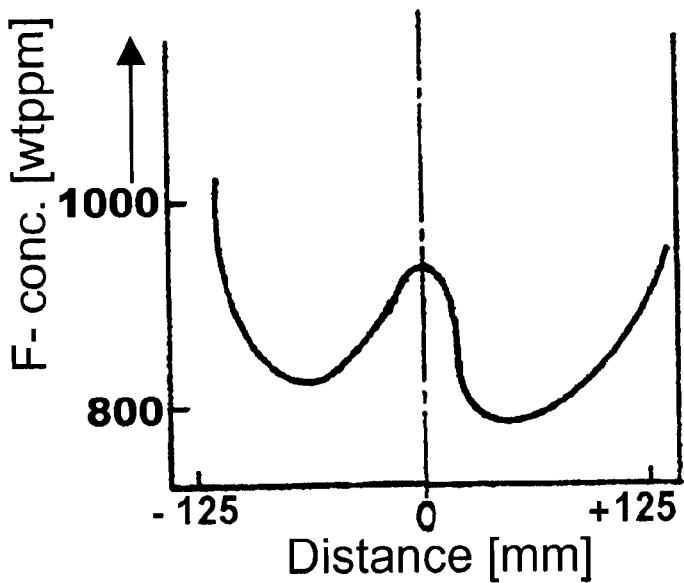
Fig. 7

US 6,473,227 B1

SILICA GLASS OPTICAL MATERIAL FOR PROJECTION LENS TO BE UTILIZED IN VACUUM ULTRAVIOLET RADIATION LITHOGRAPHY, METHOD FOR PRODUCING THE SAME, AND PROJECTION LENS

INDUSTRIAL FIELD OF APPLICATION

The present invention relates to a silica glass optical material, a method for producing the same, and to a projection lens; in further detail, it relates to a silica glass optical material for a projection lens to be used in vacuum ultraviolet radiation lithography using radiation from 155 to 195 nm in wavelength (mainly, in an aligner for producing ultra high density integrated circuits using an excimer laser or an excimer lamp as the light source), to a method for producing the same, and to the projection lens.

Conventionally, ultraviolet radiation using a mercury vapor lamp, such as g-line and i-line, had been used as the light source for producing patterns of integrated circuits on a silicon wafer. However, as the semiconductor devices become finer, the aforementioned g-line and i-line found limits in resolution. Accordingly, excimer lasers which emit radiation with shorter wavelength attracted attention, and a photolithographic device using KrF excimer laser (248 nm) has been developed and put into practice. However, a higher degree of integration of the semiconductor devices is expected to be achieved in the near future, and this requires a light source capable of producing fine patterns with line widths of 0.1 $\mu$m or still finer. As the light sources capable of satisfying the requirements above, there can be mentioned high power output vacuum ultraviolet radiation from 155 to 195 nm in wavelength. Thus, efforts are devoted mainly to the development of an ArF excimer laser (193 nm), as well as an ArCl excimer laser (175 nm), a $F_2$ excimer laser (157 nm), etc. However, because the high power output vacuum ultraviolet radiation are far higher in power as compared with those used conventionally in photolithographic devices, the optical materials subjected to the irradiation may suffer abrupt damage such as a drop in transmittance, an increase in refractive index, generation of strain, generation of fluorescence, occasional generation of micro-cracks, etc., and this may make the material practically unfeasible concerning their function as a projection lens.

In the light of such circumstances, the development of an optical material that suffers less damage by the irradiation of the aforementioned high power output ultraviolet radiation emitted by an excimer laser or an excimer lamp has been keenly demanded.

As a material that satisfies the aforementioned requirements, there is known a material disclosed in JP-A-Hei6-227827. More specifically, the optical material disclosed in the publication above is a transparent quartz glass produced by heating a porous quartz glass body formed by depositing fine quartz glass particles obtained by flame hydrolysis and growing it, characterized in that the transparent quartz glass contains 10 ppm or less of OH, 400 ppm or more of a halogen, and that it contains hydrogen.

As an optical material that meets to the demands above, the present inventors have proposed, in JP-B-Hei6-48734 (the term "JP-B-" as referred herein signifies "an examined published Japanese patent application"), an optical material for laser radiation having a gaseous hydrogen concentration of at least $5 \times 10^{16}$ (molecules/cm$^3$) or higher and an OH group concentration of 100 wtppm or higher. Furthermore, in JP-B-Hei6-27013, the present inventors proposed a synthetic silica glass optical body having a hydrogen gas concentration of at least $5 \times 10^{16}$ (molecules/cm$^3$) or higher, an OH group concentration of 100 wtppm or higher, and substantially free from distribution in fluctuation of refractive index by canceling out the distribution in fluctuation of refractive index based on the concentration distribution of OH groups by the distribution in fluctuation of refractive index based on the fictive temperature.

The conventional silica glass optical materials above were satisfactory when used with an excimer laser or an excimer lamp emitting radiation from 195 to 250 nm in wavelength, or with an excimer radiation 195 nm or shorter in wavelength applied to thin members such as photomasks.

However, in drawing circuit patterns using the excimer radiation above, a projection lens made of silica glass is used, and such a projection lens becomes a large optical element exceeding a size 200 mm in diameter and 30 mm in thickness. Thus, if the silica glass optical material as above is used in a projection lens, non-uniform distribution likely occurs in the concentration of hydrogen molecules and OH groups, and this leads to inferior optical characteristics ascribed to the change in transmittance and refractive index. If OH groups should be contained in the silica glass optical material in such a high concentration as to exceed 100 wtppm, the durability becomes inferior due to a drop in the initial transmittance in the vacuum ultraviolet region. That is, the optical material proposed in the published patent application suffered problems of low initial transmittance in the wavelength region of from 155 to 195 nm and of insufficient durability.

The optical material disclosed in JP-A-Hei6-227827 utilizes halogen, however, among the halogens, Cl and the like are apt to generate defects upon irradiation by ultraviolet radiation, and it suffers a serious problem of deteriorating the performance of the optical material such as transmittance in the targeted spectral region.

SUMMARY OF THE INVENTION

It is an object of the present invention is to provide a silica glass optical material having a high initial transmittance with respect to vacuum ultraviolet radiation in a wavelength region of from 155 to 195 nm, a high precision, high durability, and an excellent homogeneity.

It is a further object of the invention to provide a method for producing the silica glass optical material.

It is another object of the invention to provide a projection lens made from the silica glass optical material.

The present inventors have intensively conducted studies, and it has been found that there can be obtained a synthetic silica glass optical material having high transmittance, high homogeneity, and an excellent durability, by increasing the purity of the optical material than that disclosed in the published patent application above while controlling the concentration of the OH groups and the hydrogen molecules in a certain range, and by making the concentration distribution thereof uniform while particularly selecting fluorine from the halogens and controlling the concentration of fluorine to a specific range with the distribution thereof being axially symmetrical. The present invention has been accomplished based on these findings.

The problems above can be solved by one of the compositions described in (1) to (14) below.

(1) A silica glass optical material for a projection lens to be used in vacuum ultraviolet radiation lithography using radiation from 155 to 195 nm in wavelength, wherein, said silica glass optical material is of ultrahigh purity, contains from 1 to 10 wtppm of OH groups, from 100 to 10,000 wtppm of F, and from $1 \times 10^{17}$ to $1 \times 10^{19}$ molecules/cm$^3$ of $H_2$, and has a distribution in concentration of F that is axially symmetrical to the central axis.

(2) A silica glass optical material of (1) above, wherein the value of F/OH is in a range of from 50 to 1000.

(3) A silica glass optical material of (1) or (2) above, wherein the material is of ultrahigh purity, i.e., containing a maximum of 1 wtppb each of Li, Na, and K, a maximum of 0.5 wtppb each of Ca and Mg, and a maximum of 0.1 wtppb each of Cr, Fe, Ni, Mo, and W.

(4) A silica glass optical material described in one of (1) to (3), wherein the material contains a maximum of $1 \times 10^{17}$ molecules/cm$^3$ of $H_2O$.

(5) A silica glass optical material described in one of (1) to (4), the distribution in concentration of F that is axially symmetrical to the central axis is such that the concentration gradually increases or decreases from the central portion towards the outer peripheral portion of the silica glass optical material.

(6) A silica glass optical material described in (5), wherein the curve expressing the distribution in concentration of F that is axially symmetrical is approximately a parabola or a quadratic curve.

(7) A silica glass optical material described in one of (1) to (6), wherein the fluctuation range in concentration of F, $\Delta F$, is within 50 wtppm.

(8) A silica glass optical material described in one of (1) to (7), wherein the material contains a maximum of 10 wtppm of Cl.

(9) A silica glass optical material described in one of (1) to (8), wherein the fluctuation range in the concentration of $H_2$, $\Delta H_2$, is in a maximum of $1 \times 10^{17}$ molecules/cm$^3$.

(10) A silica glass optical material described in one of (1) to (9), wherein the fluctuation range in refractive index, $\Delta n$, in a range of not higher than $2 \times 10^{-6}$.

(11) A silica glass optical material of (1) to (10), wherein the amount of strain is not more than 1 nm/cm.

(12) A projection lens for use in vacuum ultraviolet radiation lithography using a silica glass optical material as described in one of (1) to (11).

(13) In a method for producing a silica glass optical material for projection lens to be used in vacuum ultraviolet radiation lithography using radiation from 155 to 195 nm in wavelength, said method for producing a silica glass optical material comprises producing a white colored soot body having an approximately cylindrical shape and containing OH groups by means of flame hydrolysis of a silicon compound, performing fluorine doping treatment to the resulting soot body by subjecting it to a heat treatment in a fluorine-containing gaseous atmosphere to obtain a soot body containing OH groups and fluorine, vitrifying the resulting body to obtain a transparent body by heating it in a reduced pressure atmosphere, performing zone melting rotary stirring treatment by flame heating said transparent glass body sequentially from one end portion to the other end portion to thereby realize a distribution in fluorine concentration as such to be symmetrical to the rotation axis, preparing a molding frame having a cylindrical molding cavity, melting and molding said transparent glass body into an approximately cylindrical shape by placing said glass body inside said molding frame in such a manner that the axis of rotation may be superposed to the central axis of said molding frame, a removing strain by annealing treatment, and finally performing gaseous hydrogen doping by applying heat treatment in a gaseous atmosphere containing hydrogen molecules.

(14) A method for producing a silica glass optical material of (13) above, wherein the annealing treatment is performed in a gaseous atmosphere containing hydrogen molecules, thereby performing simultaneously the annealing treatment and the hydrogen gas doping treatment.

BRIEF DESCRIPTION OF THE DRAWINGS

FIG. 1 is a graph showing a preferred fluctuation curve in fluorine concentration (parabola) for a silica glass optical material according to the present invention.

FIG. 2 is a graph showing a preferred fluctuation curve in fluorine concentration (ellipse) for a silica glass optical material according to the present invention.

FIG. 6 is a graph showing a fluctuation curve in fluorine concentration of a silica glass lens blanks obtained in Comparative Example 1.

FIG. 7 is a graph showing a fluctuation curve in fluorine concentration of a silica glass lens blanks obtained in Comparative Example 3.

PREFERRED EMBODIMENTS OF THE INVENTION

Figure 3:
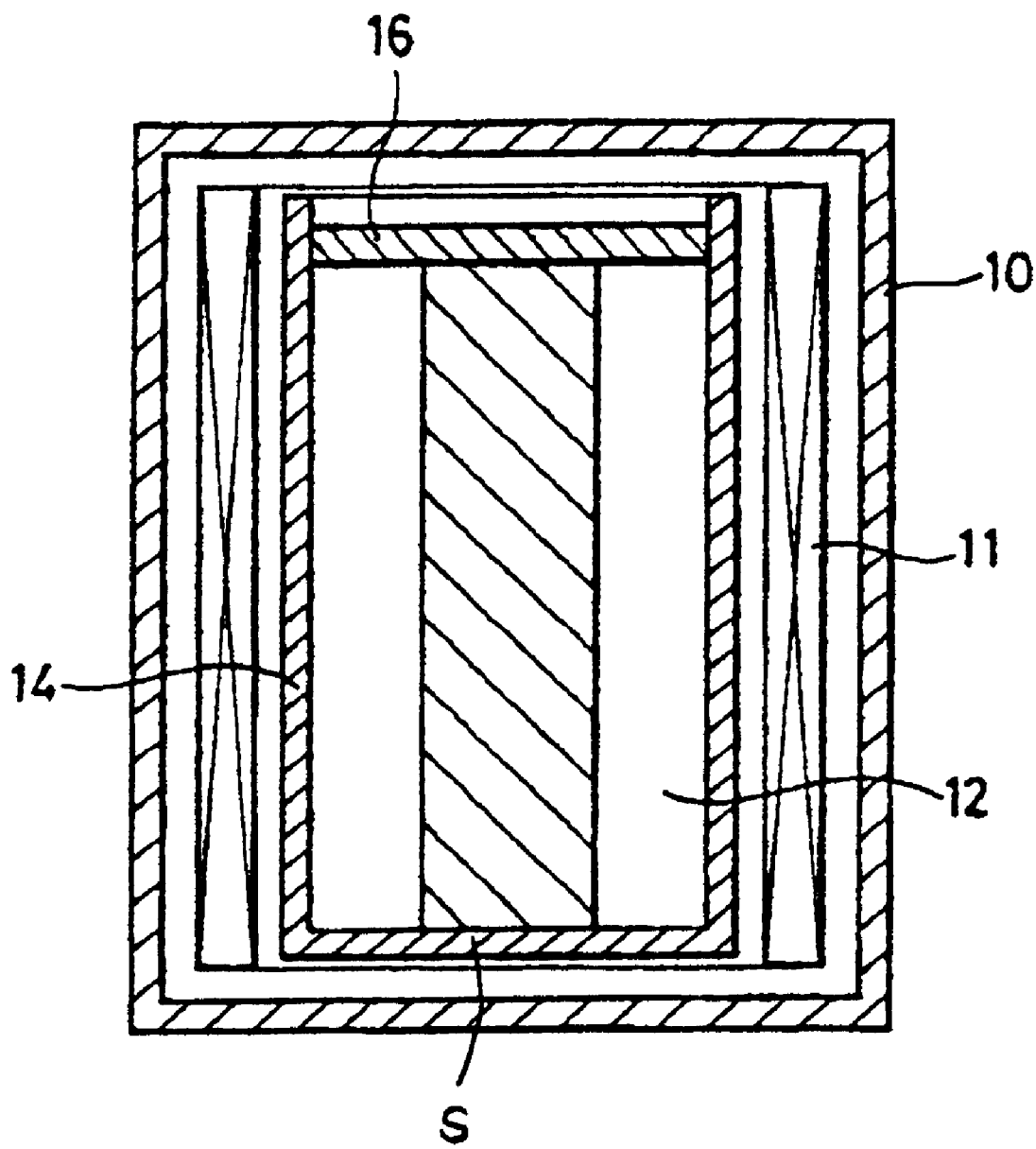
FIG. 3 is an explanatory diagram showing the step of molding cylindrical silica glass optical material according to a method for producing silica glass optical material of the present invention.
Figure 4:
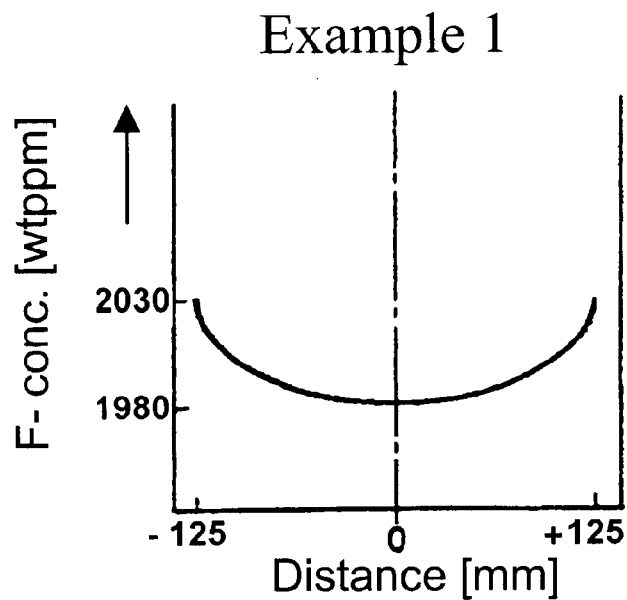
FIG. 4 is a graph showing a fluctuation curve in fluorine concentration of a silica glass lens blanks obtained in Example 1.
Figure 5:
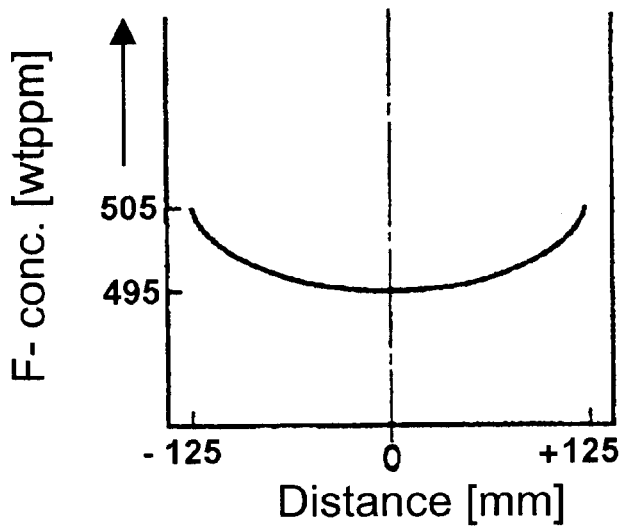
FIG. 5 is a graph showing a fluctuation curve in fluorine concentration of a silica glass lens blanks obtained in Example 5.

In the present invention, further improvements in resistance against excimer laser radiation and in resistance against excimer lamp radiation, as well as homogeneity, were achieved by combining the characteristics of the material, i.e., ultra-high purity, content of OH groups, axial distribution in the concentration of fluorine, and dissolved gaseous hydrogen.

The reason for controlling the combination of the five characteristics above is as follows.

Concerning ultra-high purity, higher transmittance and reduced energy absorption in the vacuum ultraviolet region can be achieved by reducing the concentration of metallic impurities in the silica glass. It is required that the concentrations of Li, Na, and K are each a maximum 5 wtppb, that those of Ca and Mg are each a maximum 0.5 wtppb, and that those of Cr, Fe, Ni, Mo, and W are each a maximum 0.1 wtppb. Li, Na, K, Ca, and Mg are each contained as impurities of various types of heat-resistant ceramics, and they tend to function as contaminating elements in case of producing silica glass. Cr, Fe, Ni, Mo, and W are the components of the structural material used in plants. In particular, Mo and W are used as heat-resistant metals, and they also tend to function as contaminants.

To obtain a ultra-high purity material, for instance, the following method can be employed. More specifically, the concentration of the impurities is reduced by repeating a distillation treatment on a liquid silicon compound raw material for two or three times. The high purity silicon compound raw material subjected to distillation treatment is then stored in a Teflon resin-lined vessel to prevent impurity contamination from occurring. Furthermore, in case of using the raw material, a Teflon resin-lined pipe is used for introducing the raw material into the synthetic material. A high purity alumina is used as a heat resistant material for the synthetic apparatus. Further, the graphite molding frame for use in heat molding should be a high purity graphite. A high purity alumina is used for the heat resistant material of the electric furnace for use in the annealing treatment. Thus, the object can be achieved by making all the apparatuses and jigs of high purity.

The OH groups are the terminal ends of the network structure of glass; by adding them in a proper amount, the structure can be relaxed and the Si-O-Si bonding angle can be stabilized so as to decrease the ionization function in case an excimer laser is irradiated. However, if OH groups should be incorporated in a high concentration, they lead to a drop in transmittance in the vacuum ultraviolet region. Thus, OH groups are preferably incorporated in a concentration range of from 1 to 10 wtppm.

Similar to OH groups, F also forms the terminal ends of the network structure of glass. Furthermore, unlike other halogen elements, F, although incorporated at a high concentration, does not cause deterioration in transmittance in the vacuum ultraviolet region. However, if F alone is incorporated at a high concentration in the absence of OH groups, glass undergoes decomposition during the heat treatment, and generates gaseous $F_2$ or absorption band at 7.6 eV (ca. 163 nm) ascribed to the generation of oxygen deficient defects. Accordingly, the key is to incorporate F and OH groups at the same time to suppress the thermal decomposition of glass and the generation of oxygen deficient defects.

From this point of view, it is preferred that content of OH groups and the content of F in total is a minimum of 100 wtppm, and that the ratio F/OH satisfy a value in a range of from 50 to 1000. In this case, it is preferred that the concentration of OH groups is in a range of from 1 to 10 wtppm, and that of F is in a range of from 100 to 10,000 wtppm, and particularly, 200 to 2,000 wtppm.

In the optical material according to the present invention, it is preferred that it does not substantially contain halogens other than F. Because Cl generates a drop in transmittance of glass in the vacuum ultraviolet region, i.e., the wavelength region of excimer laser radiation, it is preferred that the content thereof is a maximum of 10 wtppm.

Concerning F, it is preferred that it is incorporated in the silica glass optical material in such a manner that it yields an axially symmetrical distribution in concentration with respect to the central axis, and that the fluctuation in the concentration of F is moderate. More specifically, it is preferred that the fluctuation range in concentration of F, $\Delta F$, is within 50 wtppm, and particularly, within 30 wtppm. For instance, in case of a cylindrical silica glass body for lenses, i.e., in case of so-called lens blanks, it is preferred that the distribution in the concentration of F is viewed from the direction of the axis, it yields an axial symmetrical distribution, and that the concentration is gradually increased or decreased from the central portion of the lens blanks towards the outer peripheral portion. Since F functions to lower the diffractive index of the silica glass, to achieve lens blanks with high precision in the present invention, the fluctuation in the concentration of F is set to yield an axially symmetrical distribution. Furthermore, as described above, by simultaneously controlling the fluctuation range in the concentration of F, $\Delta F$, to fall within a predetermined range, more uniform lens blanks can be obtained. A lower limit for the values of $\Delta F$ is not particularly set, however, at present, it is about 10 wtppm.

The fluctuation range in the concentration of F, $\Delta F$, can be obtained, in case of a cylindrical silica lens optical material 250 mm in diameter and 50 mm in thickness, for instance, by measuring the concentration of F in 25 points each set at an interval of 10 mm along the direction of the diameter as viewed from the direction of the symmetry axis of rotation, and by then calculating the difference between the maximum value and the minimum value for the F concentration obtained in 25 points to obtain the fluctuation range in the concentration of F ($\Delta F$) for the entire optical material. However, it is preferred that the difference in the concentration of fluorine, $\Delta f$, between the points neighboring at a distance of 1 cm is not higher than 10 wtppm/cm.

Furthermore, the curve representing the axially symmetrical distribution in the concentration of F above is preferably a parabola (see FIG. 1) or an elliptical quadratic curve (see FIG. 2) expressed by the following equations:

$$y = lx^2 + a$$

where, "x" represents the distance from the axis of symmetry (mm); "y" represents the concentration of F (wtppm); "l" is a constant; and "a" is the concentration of F (wtppm) at the position of the axis of symmetry; or $$(y-b)^2/n + x^2/m = 1$$

where, "x" represents the distance from the axis of symmetry (mm); "y" represents the concentration of F (wtppm); "m" represents ½ of the major axis of the ellipse; "n" represents ½ of the major axis of the ellipse; and "b" is the concentration of F (wtppm) at the position of the axis of symmetry.

The dissolved gaseous hydrogen, i.e., the hydrogen molecules incorporated inside the optical material, suppresses the generation of an E' center (denoted as "E prime center", and yields an absorption band at ca. 215 nm) or a NBOH center (denoted as "Non-Bridging Oxygen Hole center", and yields absorption bands at ca. 260 nm and ca. 630 nm), and the content thereof is preferably in a range of from $1\times10^{17}$ to $1\times10^{19}$ molecules/$cm^3$, and particularly preferably, in a range of from $5\times10^{17}$ to $5\times10^{18}$ molecules/$cm^3$.

The dissolved water molecules, i.e., the water molecules that are dissolved in the optical material, undergo photochemical reaction when vacuum ultraviolet radiation is radiated by an excimer laser or an excimer lamp, and are decomposed into hydrogen and oxygen. Because the oxygen thus generated absorbs vacuum ultraviolet radiation, the presence thereof reduces the transmittance of the silica glass for the radiation 155 to 195 nm in wavelength. Moreover, oxygen changes into ozone upon absorption of the vacuum ultraviolet radiation to generate an absorption band at ca. 260 nm, called as an ozone band, and accelerates the optical damage of a silica glass. The concentration of dissolved water molecules is preferably a maximum of $1\times10^{17}$ molecules/$cm^3$. Although the lower limit is not set, at present, it is about $1\times10^{16}$ molecules/$cm^3$.

In the silica glass optical material according to the present invention, the fluctuation in refractive index, $\Delta n$, is not higher than $2\times10^{-6}$. By thus setting $\Delta n$ in the range above, the material is feasible to be used in a highly uniform lens, prism, etc., that is assembled in a photolithographic apparatus. A maximum value for Δn of $2\times10^{-6}$ requires that the material is at least free of striae in one direction. Furthermore, by setting Δn to a maximum value of $2\times10^{-6}$, it enables gaseous hydrogen to be uniformly doped. The reason for this is, because a glass having a large value for Δn yields a large fluctuation in the concentration of F, presumably, the concentration of gaseous hydrogen is influenced by the concentration of F. Furthermore, to obtain Δn values a maximum of $2\times10^{-6}$, it is necessary that the distribution in the concentration of F is in an axially symmetrical distribution, controlling the fluctuation range of the concentration within 50 wtppm, and performing the annealing treatment while precisely controlling the temperature distribution inside the silica glass body. Although the lower limit for Δn is not set, a value of about $3\times10^{-7}$ is achieved at present.

In the silica glass optical material according to the present invention, the amount of strain is preferably 1 nm/cm or less. By setting the amount of strain at a range of 1 nm/cm or less, the material becomes feasible to be used in a highly uniform optical lens that is assembled into a photolithographic apparatus. To achieve such a value, in particular, it is necessary that the distribution in the concentration of ΔF is in an axially symmetrical distribution, controlling the fluctuation range of the concentration within 50 wtppm, and performing the annealing treatment while precisely controlling the temperature distribution inside the silica glass. Although there is no lower limit for the amount of strain, a value of about 0.3 nm/cm is achieved at present.

The method for producing the silica glass optical material above according to the present invention is described below.

To produce a silica glass optical material according to the present invention, a white soot body approximately cylindrical in shaped and containing OH groups is synthesized by means of flame hydrolysis using a silicon compound as the starting material.

As the silicon compound above, there can be preferably used, for instance, $SiCl_4$, $SiHCl_3$, $SiH_2Cl_2$, $SiCH_3Cl_3$, $Si(CH_3)_2Cl_2$, $Si(CH_3)_3(OCH)$, $Si(CH_3)_2(OCH)_2$, $Si(CH_3)(OCH)_3$, $SiF_4$, $SiHF_3$, $SiH_2F_2$, etc.

As the flame above, there can be used an oxyhydrogen flame, a propane oxyhydrogen flame, etc.

Then, the white soot body containing OH groups is subjected to fluorine doping treatment by performing heat treatment in a fluorine-containing gaseous atmosphere.

As a gas containing fluorine, it is preferred to use a gas containing from 0.1 to 100 vol. % of $SiF_4$, $CHF_3$, $SF_6$, etc. The treatment is preferably performed in the temperature range of from 400 to 1200° C., under a pressure of from about 0.1 to 10 $kgf/cm^2$ (about 0,01 to 1 MPa)

The white soot body above is then subjected to vitrification treatment to obtain a transparent body. The treatment is preferably performed in the temperature range of from 1400 to 1600° C. under an atmosphere of reduced pressure of 0.1 $kgf/cm^2$ (about 0,01 MPa) or lower, particularly, under a pressure of from 0.1 to 0.01 $kgf/cm^2$ (about 10.000 Pa to 1000 Pa). In particular, by not using a highly vacuum atmosphere, the discharge of fluorine from the outer side of the material can be prevented from occurring, and thereby the gradient in the concentration of fluorine in the inner and the outer sides of the material can be relaxed. The atmosphere above may contain He.

Subsequently, the resulting body is molded into a rod-like transparent silica glass body using flame heating, and is subjected to a zone melting rotary stirring treatment by sequentially flame heating from one end of the rod-like transparent silica glass body to the other end. The zone melting rotary stirring treatment is preferably performed reciprocally, and it is particularly preferred to perform reciprocally for two to four times. The treatments above can be performed by using the methods disclosed in, for example, U.S. Pat. Nos. 2,904,713; 3,128,166; 3,128,169, 3,483,613, etc. In this manner, the distribution in the concentration of fluorine inside the material can be made symmetrical with respect to the rotation axis. The rod-like transparent silica glass body is preferably shaped into a size about 30 to 90 mm in diameter and about 1 to 3 m in length.

Then, as shown in FIG. 3, a vacuum molding furnace 10 equipped with a molding frame 14 having a cylindrical molding cavity 12 is prepared. The diameter of the molding cavity 12 is preferably about 200 to 400 mm in diameter and 400 to 2000 mm in height. The wall of the mold frame forming the cavity 12 is preferably formed with a high purity graphite and the like. Then, the rod-like transparent silica glass body "S" is placed inside the molding cavity 12 in such a manner that the axis of rotation may match the central axis of the cylindrical molding cavity (that is, in a perpendicular state), and heated in this state. The heating temperature is in a range of from about 1700 to 2000° C. In this case, substantially no compression, i.e., pressing, from the upper side of the rod-like transparent silica glass "S", is applied, but it is allowed to melt and settle by gravitational force alone so that the rod-like transparent silica glass may be accommodated inside the molding cavity. If a pressure is forcibly applied, the axis of the rod-like transparent silica glass body "S" may become deflected, or lose its perpendicularity, and hence the distribution in the concentration of fluorine inside the material may lose its symmetry with respect to the rotation axis. Furthermore, as shown in FIG. 3, a thin lid 16 made from graphite and the like may be placed on the rod-like transparent silica glass body "S".

Subsequently, annealing treatment is applied to the resulting body. The treatment is generally carried out in air, and also usable are other types of inert gaseous atmospheres. The treatment is performed by holding the body in a temperature range of from 1000 to 1200° C. for a duration of from 1 to 100 hours, which temperature is gradually lowered to 800° C. or lower at a cooling rate of 1° C./hr to 5° C./hr, and then, to room temperature at a cooling rate of 5° C./hr to 20° C./hr. By performing annealing treatment for a sufficiently long duration of time, the strain can be sufficiently removed and the water content can be sufficiently reduced.

Finally, doping treatment using gaseous hydrogen is performed by carrying out the heat treatment in an atmosphere containing hydrogen molecules. As the atmosphere containing hydrogen molecules, it is preferred to use 100% gaseous hydrogen or a mixed gas atmosphere containing a rare gas such as Ar and gaseous hydrogen. Preferably, the treatment is performed in the temperature range of from 100 to 1000° C., and particularly, in the temperature range of from 200 to 600° C. If the treatment should be performed at a temperature higher than the range specified above, the reductive function becomes too intense, thereby generate oxygen deficient type defects. On the other hand, if the temperature should be lower than the range above, it takes too long a time for gaseous hydrogen to diffuse and dissolve into the transparent glass body.

Preferably, the treatment pressure is in a range of from about 1 $kgf/cm^2$ to 100 $kgf/cm^2$ (about 0.1 MPa to 10 MPa). Under an atmosphere of 100% gaseous hydrogen at a pressure of 1 $kgf/cm^2$ (about 0.1 MPa), the saturation dissolution concentration of gaseous hydrogen into transparent glass body is in a range of from about $1\times10^{17}$ to $4\times10^{17}$ molecules/cm$^3$; under pressures of 10 kgf/cm$^2$ and 100 kgf/cm$^2$ (about 1 MPa to 10 MPa), the saturation dissolution concentration is $1\times10^{18}$ to $4\times10^{18}$ and $1\times10^{19}$ to $4\times10^{19}$ molecules/cm$^3$, respectively.

Further, by carrying out the annealing treatment above in a gas atmosphere containing hydrogen molecules, annealing treatment and gaseous hydrogen treatment can be simultaneously performed.

The material thus obtained is prepared into lens blanks of desired shape by grinding the outer surface. By further polishing the outer surface thereof, a desired lens can be obtained.

EXAMPLES

A white-colored soot body approximately cylindrical in shape and containing OH groups was synthesized by oxyhydrogen flame hydrolysis using silicon tetrachloride SiCl$_4$ as the starting material.

Then, the thus obtained white-colored soot body containing OH groups was subjected to fluorine doping treatment by carrying out heat treatment in a gaseous atmosphere containing 1% of SiF$_4$ under a pressure of 1 kg/cm$^2$ (approximately the atmospheric pressure; 0.1 MPa) in the temperature range of from 600 to 800° C. The concentrations of OH groups and F of the silica glass optical materials obtained in Examples and Comparative Examples were varied as shown in the Tables by changing the temperature and the time duration of heat treatment.

Each of the white-colored soot bodies thus obtained were heated in a He-containing atmosphere under reduced pressure not higher than 0.1 kgf/cm$^2$ (about 0.1 MPa) in the temperature range of from 1500 to 1600° C. for vitrification to obtain a transparent glass body.

Then, after obtaining rod-like transparent silica glass bodies each 60 mm in diameter and 1.5 m in length by flame heating using propane gas, both ends of each of the glass bodies were held, and zone melting rotary stirring treatment was performed reciprocally for two times by twisting them while heating the body from one end by using the propane gas flame. Thus were obtained transparent glass bodies each free of striae in one direction. The heating was performed in such a manner that the temperature of the material reached about 2000° C.

As shown in FIG. 3, the rod-like transparent silica glass body was placed inside the molding cavity of a high purity graphite molding frame inside a vacuum furnace in such a manner that the axis of rotation thereof may be superposed with the central axis of the molding cavity, and melting was carried out to obtain a glass body 270 mm in diameter and 70 mm in thickness.

Then, after surface etching the molding by using a hydrofluoric acid solution, the resulting molding was placed inside an electric furnace made of high purity alumina refractories and equipped with a molybdenum disilicide heater, and after holding it for 20 hours at 1150° C. under the atmosphere, it was gradually cooled to 800° C. at a cooling rate of 2° C./hr, where annealing treatment was performed by switching off the power source to thereby allow it to naturally cool down at a rate of 10° C./hr to 20° C./hr.

Subsequently, the glass molding above was placed inside an electric furnace equipped with a stainless steel jacket and a tungsten mesh heater, and gaseous hydrogen doping treatment was performed in a 100% hydrogen atmosphere at 400° C. while applying pressure of 1 kgf/cm$^2$ or 10 kgf/cm$^2$ (about 0.1 MPa to 1 MPa).

Finally, the outer surface of the glass molding was cut to obtain a flat cylindrical silica glass lens blanks 250 mm in diameter and 50 mm in thickness of the Example.

Separately, the silica glass blanks for the Comparative Examples were prepared in the following manner.

In Comparative Example 1, the sample was obtained by first synthesizing a white-colored soot body containing OH groups under the same conditions as those used in Example 1, followed by F-doping treatment free of OH groups, by performing a heat treatment in a 100% SiF$_4$ gaseous atmosphere under a pressure of 1 kgf/cm$^2$ (about 0.1 MPa) and at a temperature of 900° C. Zone melting rotary stirring treatment and hydrogen doping treatment were performed under the same conditions as those used in the Example.

In Comparative Example 2, the sample was obtained in the same manner as in the Example, except for not performing hydrogen gas doping treatment. The glass thus obtained contained no dissolved gaseous hydrogen.

In Comparative Example 3, the glass was the same as in the Example, except that no zone melting rotary stirring treatment was performed.

In Comparative Example 4, the sample was obtained under the similar conditions as in the Examples, except for not performing the F-doping treatment, but by doping the body with Cl under a 100% gaseous Cl$_2$ atmosphere at a pressure of 1 kgf/cm$^2$ and at a temperature of 900° C.

In Comparative Example 5, the sample was obtained under the similar conditions as those of the Example, except for not performing the F-doping treatment.

The samples thus obtained in the Example and Comparative Examples were subjected to measurements to obtain the concentration of OH groups, the fluctuation in the concentration of OH groups, $\Delta$OH, the difference in the concentration per 1 cm between neighboring measuring points of F ($\Delta$f), the Cl concentration, the concentration of dissolved hydrogen, the fluctuation in the concentration of dissolved hydrogen, $\Delta$H$_2$, the fluctuation in refractive index, $\Delta$n, the amount of strain, and the concentration of H$_2$O, as well as the transmittance before and after irradiating radiation from a laser and a lamp, respectively. The results are given in the Tables. The distribution in the concentration of impurities of the glass samples for Examples 1 and 5, and Comparative Examples 1 and 3 is given in FIGS. 4 to 7. Furthermore, the content of impurities for the glasses obtained in Examples 1 to 5 is given in Table 3.

The physical properties and the like of the samples for Examples and Comparative Examples were measured by the methods as follows.

(i) Measurement of the OH Group Concentration

The measurement was performed in accordance with the method described in D. M. DODD and D. B. FRASER, Optical determination of OH in fused silica, *Journal of Applied Physics,* Vol. 37(1966), p. 3911.

(ii) Measurement of the Fluctuation in Concentration of OH Groups and the Mean Value Thereof In a cylindrical silica glass optical material 250 mm in diameter and 50 mm in length, the concentration of OH groups was measured at 25 points at an interval of 10 mm along the direction of the diameter as observed from the direction of the symmetrical rotary axis.

The fluctuation in the concentration of OH groups ($\Delta$OH) for the entire optical material is obtained from the maximum and the minimum values of the OH concentration measured at 25 points. The mean concentration of the OH groups is calculated from the arithmetic mean of the 25 values of OH concentration thus obtained.

(III) Measurement of the Concentration of Hydrogen Molecules

The measurement was performed in accordance with the method described in V. K. KHOTIMCHENKO et al., Determining the content of hydrogen dissolved in quartz glass using the methods of Raman scattering and mass spectrometry, *Journal of Applied Spectroscopy,* Vol. 46, No. 6(1987), pp. 632–635.

(iv) Measurement of the Fluctuation in Concentration of Hydrogen Molecules $\Delta H_2$ In a cylindrical silica glass optical material 250 mm in diameter and 50 mm in length, the concentration of $H_2$ was measured at 25 points at an interval of 10 mm along the direction of the diameter as observed from the direction of the symmetrical rotary axis. The fluctuation in the concentration of $H_2$ ($\Delta H_2$) for the entire optical material is obtained from the maximum and the minimum values of the $H_2$ concentration measured at 25 points. The mean concentration of $H_2$ is calculated from the arithmetic mean of the 25 values of $H_2$ concentration thus obtained.

(v) Measurement of the Concentration of Chlorine

The measurement was performed by decomposing the sample with an aqueous HF solution, and nephelometry was applied after adding $AgNO_3$ to the resulting solution.

(vi) Measurement of the Concentration of Fluorine

The measurement was performed by decomposing the sample with an aqueous NaOH solution, and the concentration of F was measured by means of ion electrode method.

(vii) Measurement of the Fluctuation in Concentration of Fluorine $\Delta F$

In a cylindrical silica glass optical material 250 mm in diameter and 50 mm in length, the concentration of F was measured at 25 points at an interval of 10 mm along the direction of the diameter as observed from the direction of the symmetrical rotary axis. The fluctuation in the concentration of F ($\Delta F$) for the entire optical material is obtained from the maximum and the minimum values of the F concentration measured at 25 points. The mean concentration of F is calculated from the arithmetic mean of the 25 values of F concentration thus obtained.

(viii) Difference in Fluorine Concentration Between the Neighboring Measuring Points, $\Delta f$ Among the difference in the concentration of fluorine per 1 cm $\Delta f$ (wtppm/cm) obtained for the neighboring points of the 25 measuring points employed in the measurement of the fluctuation in the concentration of fluorine, $\Delta F$, described above in (vii), the maximum value was taken.

(ix) Measurement of Impurities Contained in Silica Glass

Atomic absorption spectroscopy was used for Na, K, Mg, Ca, Fe, and induction coupled plasma mass spectroscopy (ICP-MS) method was used for Li, Cr, Ni, Mo, and W.

(x) Measurement of the Fluctuation in Refractive Index ($\Delta n$)

Measurement was made by interference method using He—Ne laser (633 nm) as the light source.

The value was taken in an area 230 mm in diameter.

(xi) Measurement of Birefringence (Amount of Strain)

Retardation method was used by employing strain gauge equipped with polarizers.

The value was taken in an area 230 mm in diameter.

(xii) Measurement of Transmittance for a Radiation 193 nm in Wavelength after Irradiating ArF Excimer Laser Radiation To a sample 30×20 $mm^2$ in area and 10 mm in thickness having a mirror polished plane on both surfaces, a laser radiation 193 nm in wavelength was irradiated at a half width of 3 nm, a half pulse life width of 17 nsec, and an energy density of 30 $mJ/cm^2$/shot, at a frequency of 100 Hz and an irradiation repetition of $1 \times 10^6$ shots, and the transmittance was measured for a light 193 nm in wavelength 1 minute after the irradiation.

(xiii) Measurement of Transmittance for a Radiation 172 nm in Wavelength after Irradiating $Xe_2$ Excimer Lamp Radiation To a sample 30×20 $mm^2$ in area and 10 mm in thickness having a mirror polished plane on both surfaces, a radiation 172 nm in wavelength from a lamp was irradiated at a half width of 14 nm and a lamp energy density of 10 $mW/cm^2$ for a duration of 14 days, and the transmittance was measured for a light 172 nm in wavelength 1 minute after the irradiation.

(xiv) Measurement of the Concentration of Molecules

Measurement was performed in accordance with the method described in Y. Morimoto et al., Analysis of gas released from vitreous silica, *Journal of Non-crystalline solids,* Vol. 1, No. 139 (1992), pp.35–46.

TABLE 1

|  | Example 1 | Example 2 | Example 3 |
|---|---|---|---|
| Sample size (diameter × thickness) (mm) | 250 × 50 | 250 × 50 | 250 × 50 |
| Mean concentrn. of OH groups (wtppm) | 2 | 3 | 6 |
| ΔOH (wtppm) | <1 | <1 | <1 |
| Mean F concentration (wtppm) | 2000 | 1300 | 600 |
| ΔF (wtppm) | 50 | 50 | 30 |
| Distribution in F concentration | Semi-elliptical Axial symmetry | semi-elliptical axial symmetry | semi-elliptical axial symmetry |
| F/OH | 1000 | 433 | 100 |
| Δf (wtppm) | <5 | <5 | <5 |
| Cl concentration (wtppm) | <10 | <10 | <10 |
| Mean concentrn. of $H_2$ (molecules/$cm^3$) | $3 \times 10^{17}$ | $3 \times 10^{17}$ | $3 \times 10^{17}$ |
| $\Delta H_2$ (molecules/$cm^3$) | $<5 \times 10^6$ | $<5 \times 10^6$ | $<5 \times 10^{16}$ |
| Fluctuation in refractive index $\Delta n$ | $2 \times 10^6$ | $1 \times 10^{-6}$ | $7 \times 10^{-7}$ |
| Strain (nm/cm) | ≦1 | ≦1 | ≦1 |
| $H_2O$ concentration (molecules/$cm^3$) | $<1 \times 10^{17}$ | $<1 \times 10^{17}$ | $<1 \times 10^{17}$ |
| Irradiation using ArF laser |  |  |  |
| Transmittance before irradiation (%) | 90 | 90 | 90 |
| Transmittance after irradiation (%) | 87 | 88 | 90 |
| Irradiation using $Xe_2$ lamp |  |  |  |
| Transmittance before irradiation (%) | 88 | 88 | 88 |
| Transmittance after irradiation (%) | 86 | 87 | 87 |

| No. Experiments | Example 4 | Example 5 |
|---|---|---|
| Sample size (diameter × thickness) (mm) | 250 × 50 | 250 × 50 |
| Mean concentration of OH groups (wtppm) | 6 | 10 |
| ΔOH (wtppm) | <1 | 2 |
| Mean concentration of F (wtppm) | 600 | 500 |
| ΔF (wtppm) | 30 | 10 |
| Distribution in F concentration | Parabola axial symmetry | semi-elliptical axial symmetry |
| F/OH | 100 | 50 |
| Δf (wtppm) | <5 | <5 |
| Cl Concentration (wtppm) | <10 | <10 |
| Mean concentration of $H_2$ (molecules/$cm^3$) | $3 \times 10^{16}$ | $3 \times 10^{17}$ |
| $\Delta H_2$ (molecules/$cm^3$) | $1 \times 10^{17}$ | $<5 \times 10^{16}$ |

TABLE 1-continued

| | | |
|---|---|---|
| Fluctuation in refractive index Δn | $7 \times 10^{-7}$ | $4 \times 10^{-7}$ |
| strain (nm/cm) | ≦1 | ≦1 |
| $H_2O$ concentration (molecules/cm³) | $<1 \times 10^{17}$ | $<1 \times 10^{17}$ |
| Transmittance before irradiation (%) | 90 | 90 |
| Transmittance after irradiation (%) | 90 | 90 |
| Transmittance before irradiation (%) | 88 | 88 |
| Transmittance after irradiation (%) | 88 | 87 |

TABLE 2

| | (Comp. Examples) | | |
|---|---|---|---|
| | Comp Ex. 1 | Comp. Ex. 2 | Comp. Ex. 3 |
| Sample size (diameter × thickness) (mm) | 250 × 50 | 250 × 50 | 250 × 50 |
| Mean concentration of OH groups (wtppm) | <0.1 | 30 | 30 |
| ΔOH (wtppm) | <0.1 | <5 | 20 |
| Mean F concentration (wtppm) | 5000 | 900 | 900 |
| ΔF (wtppm) | 200 | 20 | 200 |
| Distribution in F concentration | semi-elliptical axial symmetry | semi-elliptical axial symmetry | non-axial symmetry |
| F/OH | — | 30 | 30 |
| Δf (wtppm) | 200 | <5 | 50 |
| Cl concentration (wtppm) | <10 | <10 | <10 |
| Mean concentrn. of $H_2$ (molecules/cm³) | $3 \times 10^{17}$ | $<5 \times 10^{16}$ | $3 \times 10^{17}$ |
| $ΔH_2$ (molecules/cm³) | $5 \times 10^{16}$ | $<5 \times 10^{16}$ | $2 \times 10^{17}$ |
| Fluctuation in refractive index Δn | $5 \times 10^{-6}$ | $1 \times 10^{-6}$ | $7 \times 10^{-6}$ |
| strain (nm/cm) | 6 | <1 | 5 |
| $H_2O$ concentration (molecules/cm³) | $<1 \times 10^{17}$ | $<1 \times 10^{17}$ | $<2 \times 10^{17}$ |
| Irradiation using ArF laser | | | |
| Transmittance before irradiation (%) | 90 | 90 | 90 |
| Transmittance after irradiation (%) | 75 | 60 | 80–90 |
| Irradiation using $Xe_2$ lamp | | | |
| Transmittance before irradiation (%) | <5 | 88 | 88 |
| Transmittance after irradiation (%) | <5 | 54 | 85–88 |

| No. Experiments | Comp. Ex. 4 | Comp. Ex. 5 |
|---|---|---|
| Sample size (diameter × thickness) (mm) | 250 × 50 | 250 × 50 |
| Mean concentration of OH groups (wtppm) | 20 | 200 |
| ΔOH (wtppm) | 1 | 30 |
| Mean concentration of F (wtppm) | <10 | <10 |
| ΔF (wtppm) | <10 | <10 |
| Distribution in F concentration | — | — |
| F/OH | — | — |
| Δf (wtppm) | — | — |
| Cl Concentration | 1000 | <10 |

TABLE 2-continued

| | (Comp. Examples) | |
|---|---|---|
| (wtppm) | | |
| Mean concentration of $H_2$ (molecules/cm³) | $3 \times 10^{17}$ | $3 \times 10^{17}$ |
| $ΔH_2$ (molecules/cm³) | $<5 \times 10^{16}$ | $<5 \times 10^{16}$ |
| Fluctuation in refractive index Δn | $1 \times 10^{-6}$ | $7 \times 10^{-7}$ |
| Strain (nm/cm) | <1 | <1 |
| $H_2O$ concentration (molecules/cm³) | $<1 \times 10^{17}$ | $<5 \times 10^{17}$ |
| Irradiation using ArF laser | | |
| Transmittance before irradiation (%) | 90 | 90 |
| Transmittance after irradiation (%) | 78 | 86 |
| Irradiation using $Xe_2$ lamp | | |
| Transmittance before irradiation (%) | <5 | 82 |
| Transmittance after irradiation (%) | <5 | 72 |

TABLE 3

| (Analysis of impurities, (unit: wtpppb)) | | | | | |
|---|---|---|---|---|---|
| Element | Example 1 | Example 2 | Example 3 | Example 4 | Example 5 |
| Li | <0.5 | <0.5 | <0.5 | 0.5 | 0.7 |
| Na | 0.8 | 0.8 | 1.0 | 1.0 | 1.0 |
| K | 0.5 | 0.1 | 0.1 | 0.1 | 0.1 |
| Ca | 0.3 | 0.5 | 0.5 | <0.1 | <0.1 |
| Mg | <0.1 | <0.1 | 0.5 | <0.1 | 0.1 |
| Cr | 0.1 | <0.1 | <0.1 | <0.1 | <0.1 |
| Fe | 0.1 | 0.1 | 0.1 | <0.1 | <0.1 |
| Ni | 0.1 | <0.1 | <0.1 | <0.1 | <0.1 |
| Mo | 0.1 | 0.1 | <0.1 | <0.1 | <0.1 |
| W | 0.1 | 0.1 | <0.1 | <0.1 | <0.1 |

The effect of the present invention can be seen clearly from the Table above. More specifically, the glasses obtained in Examples 1 to 5 all showed high transmittance even after irradiating excimer radiation, and yielded a Δn value of $1 \times 10^{-6}$ or smaller as to show high uniformity.

On the other hand, the glass obtained in Comparative Example 1 was free of OH groups but contained 5000 wtppm of F. Thus, the glass was found to have inferior resistance against excimer laser radiation, because it decomposed during the application of various types of heat treatments and generated gaseous $F_2$, and resulted in the generation of a 7.6 eV absorption band.

The glass obtained in Comparative Example 2 was prepared without applying gaseous hydrogen doping treatment and was therefore free of dissolved gaseous hydrogen, and showed inferior resistance against excimer laser radiation.

In the glass of Comparative Example 3, zone melting rotary stirring treatment was not applied. Accordingly, the glass showed relatively high values for ΔF and $ΔH_2$. Furthermore, the value of Δn was also found to be large. The resistance against excimer laser radiation was found to vary from a portion to portion of the glass.

In Comparative Example 4, the glass was prepared without applying F-doping treatment but Cl-doping was performed under a 100% gaseous $Cl_2$ atmosphere. Thus, it is free of fluorine, but contains 1000 wtppm of Cl. Hence, it generated a 7.6 eV absorption band, and in the irradiation of an excimer lamp, the transmittance was not only poor from the initial stage, but the light transmittance thereof was severely impaired due to the generation of E' center on irradiating the excimer laser radiation.

In Comparative Example 5, the glass was prepared without applying F-doping treatment but contained OH groups in an amount of 200 wtppm. Accordingly, it showed inferior resistance against excimer laser radiation.

What is claimed is:

1. A silica glass optical material for projection lens to be used in vacuum ultraviolet radiation lithography using radiation from 155 to 195 nm in wavelength, wherein, said silica glass optical material is of ultrahigh purity, contains from 1 to 10 wtppm of OH groups, from 100 to 10,000 wtppm of F, and from $1\times10^{17}$ to $1\times10^{19}$ molecules/cm$^3$ of $H_2$, and has a distribution in concentration of F that is axially symmetrical to the central axis, wherein the material is of ultrahigh purity as such containing 1 wtppm or less each of Li, Na, and K, 0.5 wtppb or less each of Ca and Mg, and 0.1 wtppb or less each of Cr, Fe, Ni, Mo, and W.

2. A silica glass optical material as claimed in claim 1, wherein the value for the concentration ratio of F/OH is in a range of from 50 to 1000.

3. A silica glass optical material as claimed in claim 1, wherein the material contains $1\times10^{17}$ molecules/cm$^3$ or less of $H_2O$.

4. A silica glass optical material as claimed in claim 1, wherein the distribution in concentration of F that is axially symmetrical to the central axis is such that the concentration gradually increases or decreases from the central portion towards the outer peripheral portion of the silica glass optical material.

5. A silica glass optical material as claimed in claim 4, wherein the curve expressing the distribution in concentration of F that is axially symmetrical is approximately a parabola or a quadratic curve.

6. A silica glass optical material as claimed in claim 1, wherein a fluctuation range in concentration of F, $\Delta F$, is within 50 wtppm.

7. A silica glass optical material as claimed in claim 1, wherein the content of Cl is 10 wtppm or less.

8. A silica glass optical material as claimed in claim 1, wherein a fluctuation range in the concentration of $H_2$, $\Delta H_2$, is in a range of $1\times10^{17}$ molecules/cm$^3$ or less.

9. A silica glass optical material as claimed in claim 1, wherein a fluctuation range in refractive index, $\Delta n$, in a range of not higher than $2\times10^{-6}$.

10. A silica glass optical material for projection lens to be used in vacuum ultraviolet radiation lithography using radiation from 155 to 195 nm in wavelength, wherein, said silica glass optical material is of ultrahigh purity, contains from 1 to 10 wtppm of OH groups, from 100 to 10,000 wtppm of F, and from $1\times10^{17}$ to $1\times10^{19}$ molecules/cm$^3$ of $H_2$, and has a distribution in concentration of F that is axially symmetrical to the central axis, wherein the amount of strain is not more than 1 nm/cm.

11. A projection lens for use in vacuum ultraviolet radiation lithography using a silica glass optical material as claimed in claim 1.

12. In a method for producing a silica glass optical material for projection lens to be used in vacuum ultraviolet radiation lithography using radiations from 155 to 195 nm in wavelength, wherein said silica glass optical material is of ultrahigh purity, contains from 1 to 10 wtppm of OH groups, from 100 to 10,000 wtppm of F, and from $1\times10^{17}$ to $1\times10^{19}$ molecules/cm$^3$ of $H_2$, and has a distribution in concentration of F that is axially symmetrical to the central axis, wherein the material is of ultrahigh purity as such containing 1 wtppm or less each of Li, Na, and K, 0.5 wtppb or less each of Ca and Mg, and 0.1 wtppb or less each of Cr, Fe, Ni, Mo, and W, said method for producing a silica glass optical material comprising:

producing a white colored soot body having an approximately cylindrical shape and containing OH groups by means of flame hydrolysis of a silicon compound, performing fluorine doping treatment to the resulting soot body by subjecting it to a heat treatment in a fluorine-containing gaseous atmosphere to obtain a soot body containing OH groups and fluorine, vitrifying the resulting body to obtain a transparent body by heating it in a reduced pressure atmosphere, performing zone melting rotary stirring treatment by flame heating sequentially said transparent glass body from one end portion to the other end portion to thereby realize a distribution in fluorine concentration as such to be symmetrical to the rotation axis, preparing a molding frame having a cylindrical molding cavity, melting and molding said transparent glass body into an approximately cylindrical shape by placing said glass body inside said molding frame in such a manner that the rotation axis may be superposed to the central axis of said molding frame, removing strain by annealing treatment, and finally performing gaseous hydrogen doping by applying heat treatment in a gaseous atmosphere containing hydrogen molecules.

13. A method for producing a silica glass optical material as claimed in claim 12, wherein the annealing treatment is performed in a gaseous atmosphere containing hydrogen molecules, thereby performing simultaneously the annealing treatment and the hydrogen gas doping treatment.

14. A silica glass optical material as claimed in claim 10, wherein the value for the concentration ratio of F/OH is in a range of from 50 to 1000.

15. A silica glass optical material as claimed in claim 10, wherein the material is of ultrahigh purity as such containing 1 wtppm or less each of Li, Na, and K, 0.5 wtppb or less each of Ca and Mg, and 0.1 wtppb or less each of Cr, Fe, Ni, Mo, and W.

16. A silica glass optical material as claimed in claim 10, wherein the material contains $1\times10^{17}$ molecules/cm$^3$ or less of $H_2O$.

17. A silica glass optical material as claimed in claim 10, wherein the distribution in concentration of F that is axially symmetrical to the central axis is such that the concentration gradually increases or decreases from the central portion towards the outer peripheral portion of the silica glass optical material.

18. A silica glass optical material as claimed in claim 17, wherein the curve expressing the distribution in concentration of F that is axially symmetrical is approximately a parabola or a quadratic curve.

19. A silica glass optical material as claimed in claim 10, wherein a fluctuation range in concentration of F, $\Delta F$, is within 50 wtppm.

20. A silica glass optical material as claimed in claim 10, wherein the content of Cl is 10 wtppm or less.

21. A silica glass optical material as claimed in claim 10, wherein a fluctuation range in the concentration of $H_2$, $\Delta H_2$, is in a range of $1\times10^{17}$ molecules/cm$^3$ or less.

22. A silica glass optical material as claimed in claim 10, wherein a fluctuation range in refractive index, Δn, in a range of not higher than $2 \times 10^{-6}$.

23. A projection lens for use in vacuum ultraviolet radiation lithography using a silica glass optical material as claimed in claim 10.

24. A method for producing a silica glass optical material according to claim 11, comprising:

producing a white colored soot body having an approximately cylindrical shape and containing OH groups by means of flame hydrolysis of a silicon compound, performing fluorine doping treatment to the resulting soot body by subjecting it to a heat treatment in a fluorine-containing gaseous atmosphere to obtain a soot body containing OH groups and fluorine, vitrifying the resulting body to obtain a transparent body by heating it in a reduced pressure atmosphere, performing zone melting rotary stirring treatment by flame heating sequentially said transparent glass body from one end portion to the other end portion to thereby realize a distribution in fluorine concentration that is axially symmetric about the rotation axis, preparing a molding frame having a cylindrical molding cavity, melting and molding said transparent glass body into an approximately cylindrical shape by placing said glass body inside said molding frame in such a manner that the rotation axis may be superposed to the central axis of said molding frame, removing strain by annealing treatment, and finally performing gaseous hydrogen doping by applying heat treatment in a gaseous atmosphere containing hydrogen molecules.

25. A method for producing a silica glass optical material as claimed in claim 24, wherein the annealing treatment is performed in a gaseous atmosphere containing hydrogen molecules, thereby performing simultaneously the annealing treatment and the hydrogen gas doping treatment.

* * * * *